(12) United States Patent
Kerxhalli et al.

(10) Patent No.: US 6,300,968 B1
(45) Date of Patent: Oct. 9, 2001

(54) COLOR PRINTING PROCESS DIRECTION COLOR REGISTRATION SYSTEM WITH EXPANDED CHEVRONS

(75) Inventors: David M. Kerxhalli, Rochester, NY (US); Olga Y. Ramirez, Marlborough, MA (US); Brian R. Conrow, Rochester, NY (US); Ronald E. Shaul, Bloomfield, NY (US); Stanley J. Wallace, Victor, NY (US); Mark A. Omelchenko, Lexington, KY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/704,632

(22) Filed: Nov. 2, 2000

(51) Int. Cl.⁷ ............................ B41J 2/385; G01D 15/06; G03G 15/01; G03G 15/00
(52) U.S. Cl. ............................................ 347/116; 399/162
(58) Field of Search .............................. 347/116; 399/301, 399/162, 165, 49, 39, 40

(56) References Cited

U.S. PATENT DOCUMENTS

| | | |
|---|---|---|
| 5,287,162 | 2/1994 | De Jong et al. . |
| 5,384,592 | 1/1995 | Wong .................................. 347/116 |
| 5,418,556 | 5/1995 | Andrews .............................. 347/116 |
| 5,510,877 | 4/1996 | De Jong et al. . |
| 5,537,190 | 7/1996 | Folkins et al. . |
| 5,631,686 | 5/1997 | Castelli et al. ....................... 347/133 |
| 5,748,221 | 5/1998 | Castelli et al. ....................... 347/232 |
| 5,774,156 | 6/1998 | Guerin ................................. 347/116 |
| 5,909,235 | 6/1999 | Folkins ................................ 347/240 |
| 5,946,537 | * 8/1999 | Nakayasu et al. ................... 399/301 |
| 6,014,154 | 1/2000 | Guerin ................................. 347/116 |
| 6,198,896 | * 3/2001 | Nakayasu et al. ................... 399/301 |

* cited by examiner

Primary Examiner—Susan S. Y. Lee

(57) ABSTRACT

In color printing with a color registration system for the registration of plural color images on an image bearing surface, such as a photoreceptor belt of a color printer, registration marks are imaged on the image bearing surface, which registration marks correspond to the color images and are sensed by a registration marks sensor. In an initial gross registration mode the system first automatically images first registration marks, in the form of expanded chevron targets, which are greatly expanded in the process direction so as to avoid overlapping marks even if there is initial gross misregistration, to thus provide wider initial misregistration latitude for the sensor. When an acceptable initial registration is achieved, the system automatically switches to imaging more closely spaced and more frequent second registration marks, preferably regular chevron targets, providing higher registration accuracy. These registration targets may be generated along opposite sides of the image areas, on opposite sides of the photoreceptor or other image bearing surface in the process direction.

14 Claims, 13 Drawing Sheets

COLOR PRINTING PROCESS DIRECTION COLOR REGISTRATION SYSTEM WITH EXPANDED CHEVRONS

Cross-reference is made to a commonly assigned co-pending U.S. application Ser. No. 09/662,197, filed Sep. 14, 2000 by Mark A. Omelchenko, et al, entitled "Color Printing Image Bearing Member Color Registration System," U.S. Pat. No. 6,275,244.

Disclosed is an improvement in systems for the accurate registration of images on an image bearing member of an image reproduction system, such as a xerographic printer, especially a plural color printer, relative to other such images and/or other related components of the image reproduction system. In particular, there is disclosed in the embodiment herein an improved initial process direction gross registration system and method in which special, expanded, registration marks are more easily detectable within greater tolerance ranges of registration marks sensors and initial process direction misregistrations of the image bearing member. For example, the detecting of color toner image position registration marks on a photoreceptor belt moving in its process direction with initial positional and/or velocity variations.

The registration system disclosed in the specific embodiment herein can be accomplished with little or no additional cost or complexity over existing such registration systems. It can even utilize pre-existing registration mark-on-belt (MOB) sensors and their controls, yet provide increased tolerance to, and correction of, gross initial miss-registration, without sacrificing fine registration accuracy.

By way of background, in various reproduction systems, including xerographic printing, the control and registration of the position of imageable surfaces such as photoreceptor belts, intermediate transfer belts (if utilized), and/or images thereon, is critical, and a well developed art, as shown by the exemplary patents cited below. It is well known to provide various single and/or dual axes control systems, for adjusting or correcting the lateral position and/or process position or timing of a photoreceptor belt or other image bearing member of a reproduction apparatus, such as by belt lateral steering systems and/or belt drive motor controls, and/or adjusting or correcting the lateral position and/or process position or timing of the placing of images on the belt with adjustable image generators such as laser beam scanners.

An important application of such accurate image position or registration systems is to accurately control the positions of different colors being printed on the same intermediate or final image substrate, to insure the positional accuracy (adjacency and/or overlapping) of the various colors being printed. That is not limited to xerographic printing systems. For example, precise registration control may be required over different ink jet printing heads and/or vacuum belt or other sheet transports in a plural color ink jet printer.

Of particular interest here, it is well known to provide image registration systems for the correct and accurate alignment, relative to one another, on both axes, of different plural color images on an initial imaging bearing surface member such as (but not limited to) a photoreceptor belt of a xerographic color printer. That is, to improve the registration accuracy of such plural color images relative to one another and/or to the image bearing member, so that the different color images may be correctly and precisely positioned relative to one another and/or superposed and combined for a composite or full color image, to provide for customer-acceptable color printing on a final image substrate such as a sheet of paper. The individual primary color images to be combined for a mixed or full color image are often referred to as the color separations.

As noted, known means to adjust the registration of the images on either or both axes (the lateral axis and/or the process direction axis) relative to the image bearing surface and one another include adjusting the position or timing of the images being formed on the image bearing surface. That may be done by control of ROS (raster output scanner) laser beams or other known latent or visible image forming systems.

In particular, it is known to provide such imaging registration systems by means of marks-on-belt (MOB) systems, in which edge areas of the image bearing belt laterally outside of its normal imaging area are marked with registration positional marks, detectable by an optical sensor. For belt steering and motion registration systems (previously described) such registration marks can be permanent, such as by silk screen printing or otherwise permanent marks on the belt, such as belt apertures, which may be readily optically detectable. However, for image position control relative to other images on the belt, or the belt position, especially for color printing, typically these registration marks are not permanent marks. Typically they are distinctive marks imaged with, and adjacent to, the respective image, and developed with the same toner or other developer material as is being used to develop the associated image, in positions corresponding to, but outside of, the image position. Such as putting the marks along the side of the image position or in the inter-image zone between the images for two consecutive prints. Such marks-on-belt (MOB) image position or registration indicia are thus typically repeatedly developed and erased in each rotation of the photoreceptor belt. It is normally undesirable, of course, for such registration marks to appear on the final prints (on the final image substrate).

The above and further background, including examples of specific MOB registration sensors and controls, is well known to those skilled in this art, and taught in numerous products and patents thereon (of which the following are some examples). Thus, it need not be repeated herein in detail.

For example, the following five Xerox Corp. U.S. patents are noted as specifically mentioning one or more registration systems utilizing "Z" shaped marks, patterns, or targets on a photoreceptor: U.S. Pat. Nos. 5,889,545; 5,815,481; 5,302,973; 5,300,961; and 5,278,625.

Of particular interest here, the following five Xerox Corp. U.S. patents are noted as specifically mentioning one or more registration systems utilizing "chevron" photoreceptor registration marks for color printing: U.S. Pat. Nos. 6,014,154; 5,774,156; 5,537,190; 5,418,556; and (of particular interest) 5,287,162, entitled "Method and Apparatus for Corrections of Color Registration Errors," issued Feb. 15, 1994 by dejong, et al., describing registration with chevrons and also bi-cell detectors or CCD detectors. The latter and other patents noted above, and other Xerox Corp. patents such as U.S. Pat. Nos. 5,748,221; 5,510,877 and 5,631,686, issued May 20, 1997 to Castelli, et al, are also relevant to MOB sensors and/or systems for image shifting into registration by ROS shifting and/or belt position shifting. Said U.S. Pat. No. 5,748,221, issued Nov. 1, 1995 to Castelli, et al, also describes chevron MOBs and bi-cells sensors.

Another MOB registration system for multicolor image registration which is disclosed as specific to intermediate image bearing belts (in addition to U.S. Pat. No. 5,287,162 above) is Fuji Xerox Co. U.S. Pat. No. 6,094,551. Also, U.S.

Pat. No. 4,963,899 issued Oct. 16, 1990 to Resch, also describing bi-cell sensors.

U.S. Pat. No. 5,909,235 is of interest for noting MOB sensor registration, citation of other references here therein, and a background discussion of different applicable color printing systems. Examples of some further, earlier, patents are U.S. Pat. No. 4,903,067 to Murayama et al, especially as to CCD arrays detection of registration marks on belts, and U.S. Pat. No. 4,804,979 on MOBs.

The following exemplary U.S. patents are noted for discussions of photoreceptor or intermediate belt motion sensing with permanent belt fiducial or registration (and/or belt seam location) markings, by belt holes or other apertures, and optical sensors and/or belt steering controls: U.S. Pat. Nos. 4,837,636; 5,175,570; 5,204,620; 5,208,633; 5,248,027; 5,278,587 (on plural ROS beam sweep detections for single pass registered color printing) U.S. Pat. No. 5,383,014; and pending Xerox Corp. Serial No. 09/450,375, filed Nov. 29, 1999 by Castelli, et al.

Canon U.S. Pat. No. 4,912,491, priority-filed May 30, 1987 and issued Mar. 27, 1990 to O. Hoshino, et al, appears to teach some form of permanent transparent areas of an intermediate image transfer belt for providing optically sensed registration marks, in a ROS raster imaged tandem (plural print engines) printer, for superposing plural xerographic color images with registration.

Of additional interest for registration of plural color images with sensed color registration marks on a belt is Xerox Corp. U.S. Pat. No. 5,384,592, issued Jan. 24, 1995 to Lam F. Wong, entitled "Method and Apparatus for Tandem Color Registration Control."

The following copending Xerox Corp. U.S. patent applications on color printer registration systems are also noted: Ser. No. 09/306,418, filed May 6, 1999, entitled "On-line Image-On-Image Color Registration Control Systems and Methods Based on Time-Scheduled Control Loop Switching" by Michael R. Furst, on a MOB sensor and control system; and Ser. No. 09/447,231, filed Nov. 23, 1999, entitled "Image Color Registration Sensor Calibration" by Olga Ramirez and Mark Omelchenko, on MOB sensor calibration algorithms, disclosing chevron MOBs; and Ser. No. 09/626,465, filed Jul. 26, 2000, entitled "Color Image Registration Based Upon Belt And Raster Output Scanner Synchronization" by Elias Panides, et al, on registering the leading edges of color images on a photoreceptor belt by ROS synchronization to belt registration holes.

As will be apparent from the above, it is generally well known in the art of reproduction systems that image registration control on an image bearing belt can be done based on MOB sensor measurements of developed marks on the belt indicative of respective image positions on that image bearing member (substrate). If desired, that can also be combined with additional sensor information from belt edge sensing and/or permanent belt marks or holes sensing. As also noted, a printer image registration controller and/or electronic front end (EFE) can utilize MOB sensor inputs to control ROS scan lines positioning on the photoreceptor (PR) surface to correct registration of the respective image positions on both axes. That is, without necessarily requiring MOB sensor interaction with, or control over, the PR drive or PR steering controls for process direction or lateral direction registration. However, such PR registration movement, instead of, or in addition to, such imaging position registration movement, can also be done if desired.

Further by way of background, the direct sensing of the surface motion of image receivers, such as photoreceptor belts or intermediate transfer belts, or other substrates, as by the system of the embodiment disclosed herein, enables more precise transport and/or image registration, for superior image quality.

In contrast, a principle method of accurately sensing photoreceptor belt motion in the process direction in present practice for xerographic printers is to use a relatively expensive precision machined encoder roll in contact with the back surface of the belt (or on the drive shaft of the belt drive). The encoder roll may be coupled to a rotary shaft encoder with an anti-rotational coupling that helps avoid errors from misalignment. Motion sensing errors that can contribute to errors in color registration systems with such belt-driven encoder sensors can come from encoder roll eccentricity, rotary encoder accuracy (once per roll revolution errors) as well as errors from belt slip, belt stretch, and belt thickness variations. The once per encoder roll revolution type errors may be addressed by employing design rules that locate marking elements spaced apart at integer numbers of encoder roll revolutions, to synchronize the errors between color separations. However, this imposes disadvantageous machine architecture and physical size constraints. Avoiding those constraints could enable smaller size/height machines, or location of multiple image stations on the same side of a photoreceptor belt module, which in turn enables avoidance of other errors that can be encountered when locating imagers on both sides of a belt module.

Low frequency process direction of movement errors, such as once per belt revolution, or other errors that accumulate in transporting the belt for multiple images, may even invisible to encoder roll registration controls. This is primarily attributed to belt thickness variations caused by the encoder roll sensing the belt from the backside with the belt flowing over this roll in a wrap condition. Advantages of the subject position measurement system include eliminating such error sources and thus improve registration. By directly measuring the belt surface position with a high degree of accuracy, those sensor signals can be inputted into an agile beam imager, such as the variable imaging position ROS systems shown in FIGS. 1 and 2, to implement a printing system that can allow relaxation of motion control requirements or tolerances for the belt surface, and potentially eliminating the need for an expensive precision belt movement rotary encoder and its circuitry.

Color registration systems for printing, as here, should not be confused with various color correction or calibration systems, involving various color space systems, conversions, or values, such as color intensity, density, hue, saturation, luminance, chrominance, or the like, as to which respective colors may be controlled or adjusted. Color registration systems, such as that disclosed herein, relate to positional information and positional correction (shifting respective color images laterally or in the process direction and/or providing image rotation and/or image magnification) so that different colors may be accurately superposed or interposed for customer-acceptable full color or intermixed color or accurately adjacent color printed images. The human eye is particularly sensitive to small printed color misregistrations of one color relative to one another in superposed or closely adjacent images, which can cause highly visible color printing defects such as color bleeds, non-trappings (white spaces between colors), halos, ghost images, etc.

Disclosed in the exemplary embodiment herein is an improved registration system providing improved initial or machine startup registration, capable of handling larger initial image miss-registrations of the image bearing surface in the process direction, using imaged chevron marks on the image bearing surface which are expanded in its process direction of movement. In this exemplary embodiment, in this "expanded chevrons" registration mode, the chevron registration marks may thus comprise thicker than normal chevrons of selected different colors for improved initial registration in the process direction.

In the exemplary embodiment there is also disclosed another, optional, first, initial, or gross registration mode of developing of "Z" shaped MOB registration marks on the photoreceptor belt, for a first, gross images registration, system therewith. However, the present system is not limited thereto. In any case, at optional initial or gross registration mode or step is then followed by the initial expanded chevrons registration mode or step disclosed herein. In either case, there is the disclosed in this embodiment the automatic switching to a regular or fine chevrons registration mode or step of developing those "chevron" shaped registration marks on the photoreceptor (PR) belt, and sensing their positions, as taught in the above-cited and other patents. This mode is desirable for maintaining acquired registrations. All of these different sets of different marks may provide the MOB registration marks for the registrations of the different colors of a plural color printer.

In establishing and maintaining image registration with the disclosed embodiment, all of those different PR MOB registration modes or systems can desirably utilize the same, existing, MOB sensors or detectors, such as laterally-spaced-pair or bi-cell photodiode chevron MOB detectors. They can also utilize existing positional correction software and controls for ROS or other imaging position (and/or PR position) registration correction.

A specific feature of the specific embodiment disclosed herein is to provide a method of plural color printing with a color registration system for the registration of plural color images on an image bearing surface moving in a process direction, using plural registration marks imaged on said image bearing surface, which said registration marks correspond to the positions of respective said color images on said image bearing surface, and which registration marks are sensed by a registration marks sensor for detecting the positions of said registration marks on said image bearing surface, said registration marks sensor having a limited misregistration latitude, the improvement wherein said color registration system provides an initial gross registration mode in which said color registration system automatically images a plurality of first said registration marks on said image bearing surface, said first registration marks being formed to provide a wider misregistration latitude for said registration marks sensor in said process direction, imaging said first registration marks on said image bearing surface until an initial gross registration is achieved, then automatically switching said color registration system to a second registration mode in which said color registration system automatically images a plurality of second and different said registration marks on said image bearing surface having reduced misregistration latitude in said process direction for said registration marks sensor but providing higher registration accuracy with said registration marks sensor, said second registration mode forming said second and different said registration marks more closely spaced together in said process direction on said image bearing surface than said first registration marks Further features disclosed in the embodiment herein, individually or in combination, include those wherein said second registration marks comprise a generally chevron shaped pattern, and wherein said first registration marks are expanded in the process direction relative to said second registration marks, and/or said registration marks sensor has a generally chevron shaped sensing pattern corresponding to said generally chevron shaped pattern of said second registration marks, and/or wherein said plural color images on said image bearing surface are color separations being accurately superposed to form full color images, and/or wherein both said first an second registration marks are imaged and developed with imaging material along opposite sides of said image bearing surface, and/or wherein said image bearing surface is a photoreceptor of a xerographic printing system, and/or wherein a plural color reproduction apparatus with a color registration system for the registration of plural color images on an image bearing surface movable in a process direction, which color registration system generates plural registration marks imaged on said image bearing surface corresponding to the positions of respective said color images, and further including at least one registration marks sensor for detecting the positions of said registration marks on said image bearing surface, the improvement wherein said color registration system initially generates and images first gross registration marks on said image bearing surface providing wide misregistration latitude for said registration marks sensor in said process direction until an initial gross registration is achieved, said color registration system automatically switches to generate and image more closely spaced apart fine registration marks on said image bearing surface after said initial gross registration is achieved, said fine registration marks having reduced misregistration latitude in said process direction for said registration marks sensor but providing higher color registration accuracy, and/or wherein said fine registration marks comprise sets of closely spaced generally chevron shaped registration marks, and/or wherein both said gross and fine registration marks are imaged and developed with imaging material along opposite sides of said image bearing surface, and/or wherein said image bearing surface is a photoreceptor of a xerographic printing system, and/or wherein said registration marks sensor comprises a spaced pair of elongated bi-cell detectors in a generally chevron shaped pattern, and/or wherein said image bearing surface is a photoreceptor belt of a xerographic printing system, wherein said gross registration marks are repeatedly imaged along said photoreceptor belt in one operational mode for said initial gross registration, and wherein said fine registration marks are imaged along said photoreceptor belt adjacent to said plural color images in a second and operational mode for said fine registration and/or wherein said gross registration marks comprise chevron marks repeatedly imaged along said photoreceptor belt in sets thereof in one operational mode for said initial gross registration, and wherein at least one said set includes at least one chevron mark having two legs of two different colors, one leg being a reference color and the other leg being another color being registered, and/or wherein said gross registration marks comprise chevron marks repeatedly imaged along said photoreceptor belt in sets thereof in one operational mode for said initial gross registration, and wherein at least one said set includes at least one chevron mark which is a negative black chevron mark formed by the absence of black in an area of another different and more detectable color.

The disclosed system may be operated and controlled by appropriate operation of otherwise conventional control systems in accordance with the descriptions herein. In particular is well known and preferable to program and execute control functions and logic for reproduction systems with software instructions for conventional microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control systems or methods may be implemented partially or fully in hardware, using standard logic circuits or single chip VLSI designs.

The term "reproduction apparatus" or "printer" as alternatively used herein broadly encompasses various printers, copiers or multifunction machines or systems, xerographic or otherwise, unless otherwise indicated or defined in a claim. The term "sheet" herein refers to a usually flimsy physical sheet of paper, plastic, or other suitable physical substrate for images, whether precut or web fed. A "copy sheet" may be abbreviated as a "copy" or called a "hard-copy". A "print job" is normally a set of related sheets, usually one or more collated copy sets copied from a set of original document sheets or electronic document page images, from a particular user, or otherwise related.

As to specific components of the subject apparatus or methods, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operation or methods described in the examples below, and the claims. Thus, the present invention will be better understood from this description of these specific embodiment(s), including the drawing figures (which are approximately to scale, unless indicated otherwise) wherein areas in color are cross-hatched with the corresponding official U.S. PTO cross-hatching color codes, and:

FIG. 1 is a schematic frontal view of one example of a reproduction system for incorporating one example of the subject registration system, in this case, a color-on-color xerographic printer;

FIG. 2 is a simplified schematic perspective view of part of the embodiment of FIG. 1 for better illustrating exemplary sequential ROS generation of plural color latent images and associated exemplary latent image registration marks for MOB sensing (with development stations, etc., removed for illustrative clarity), illustrating an optional initial gross registration mode with exemplary "Z" registration marks;

Figure 1:
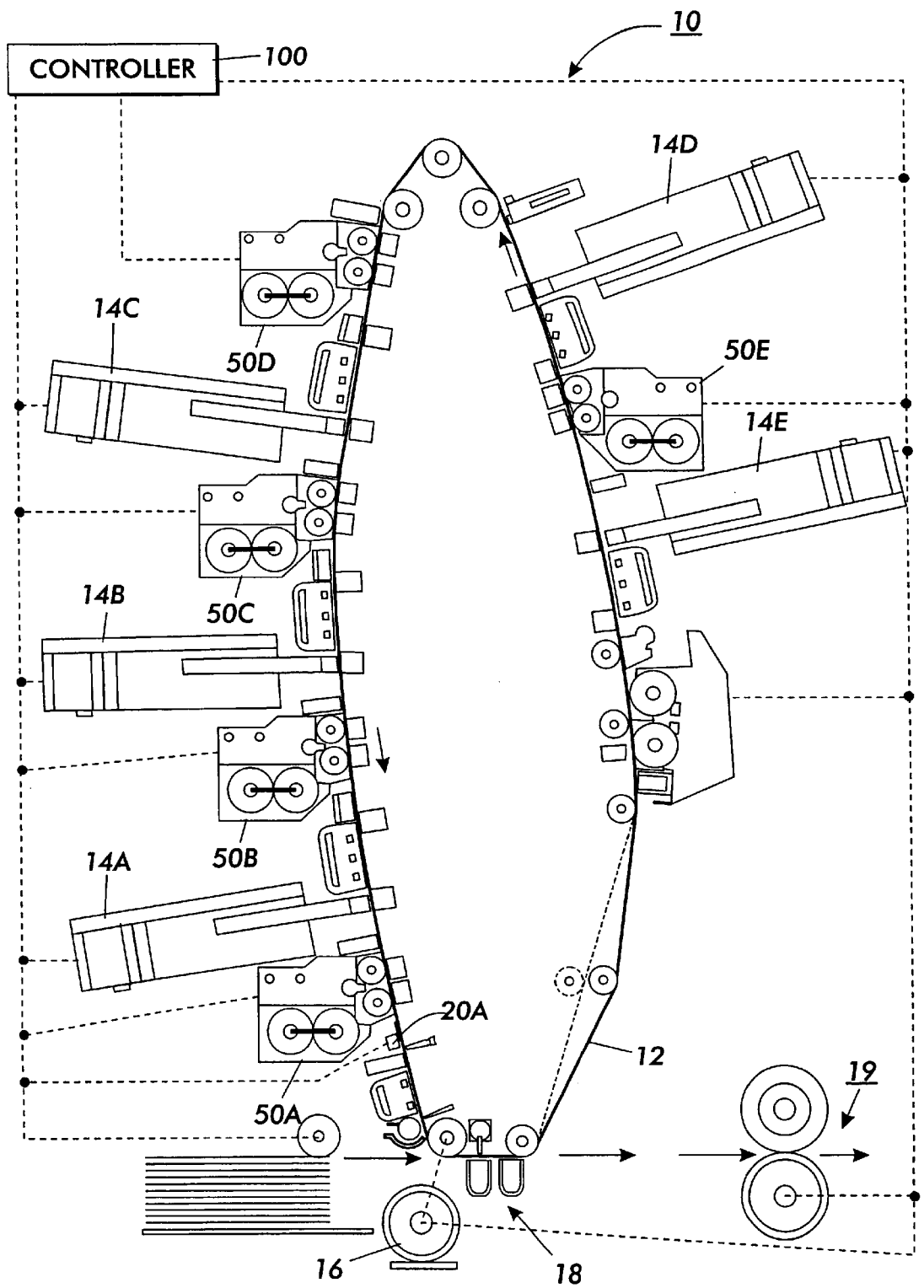
Figure 2:
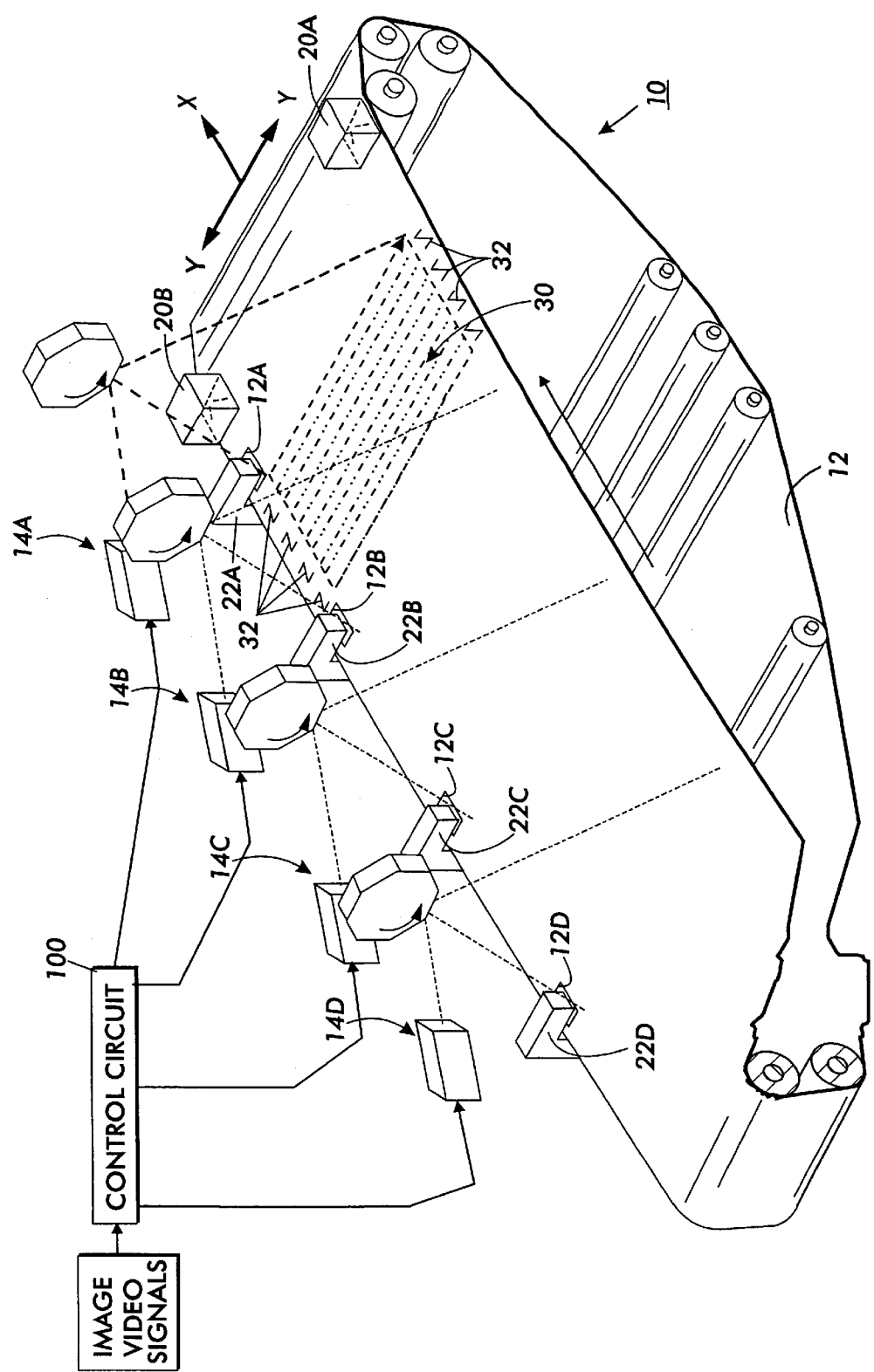
Figure 3:
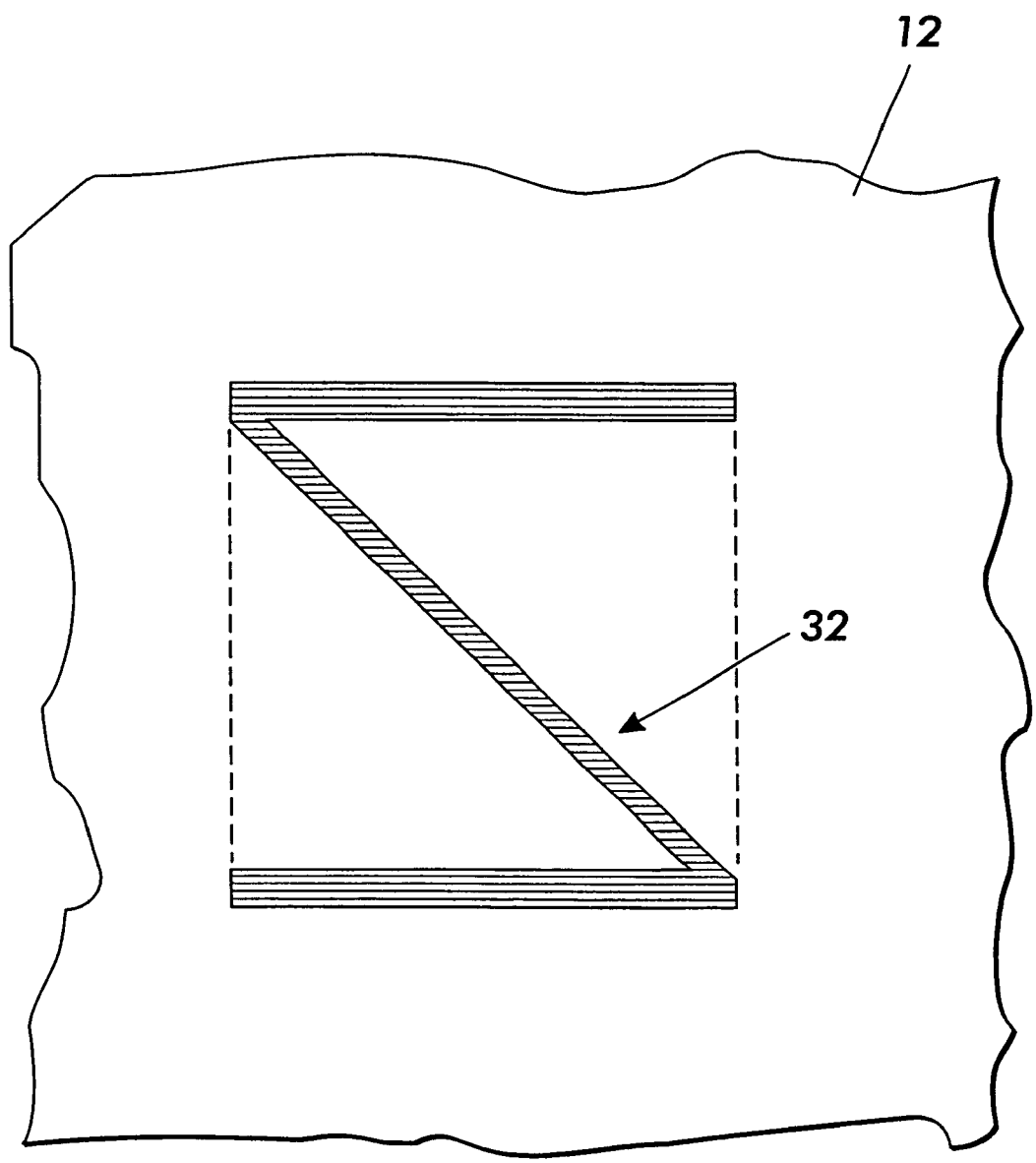
FIG. 3 is a greatly enlarged plan view of one of the exemplary "Z" registration developed marks (MOB) of FIG. 2, cross-hatched for one color.
Figure 4:
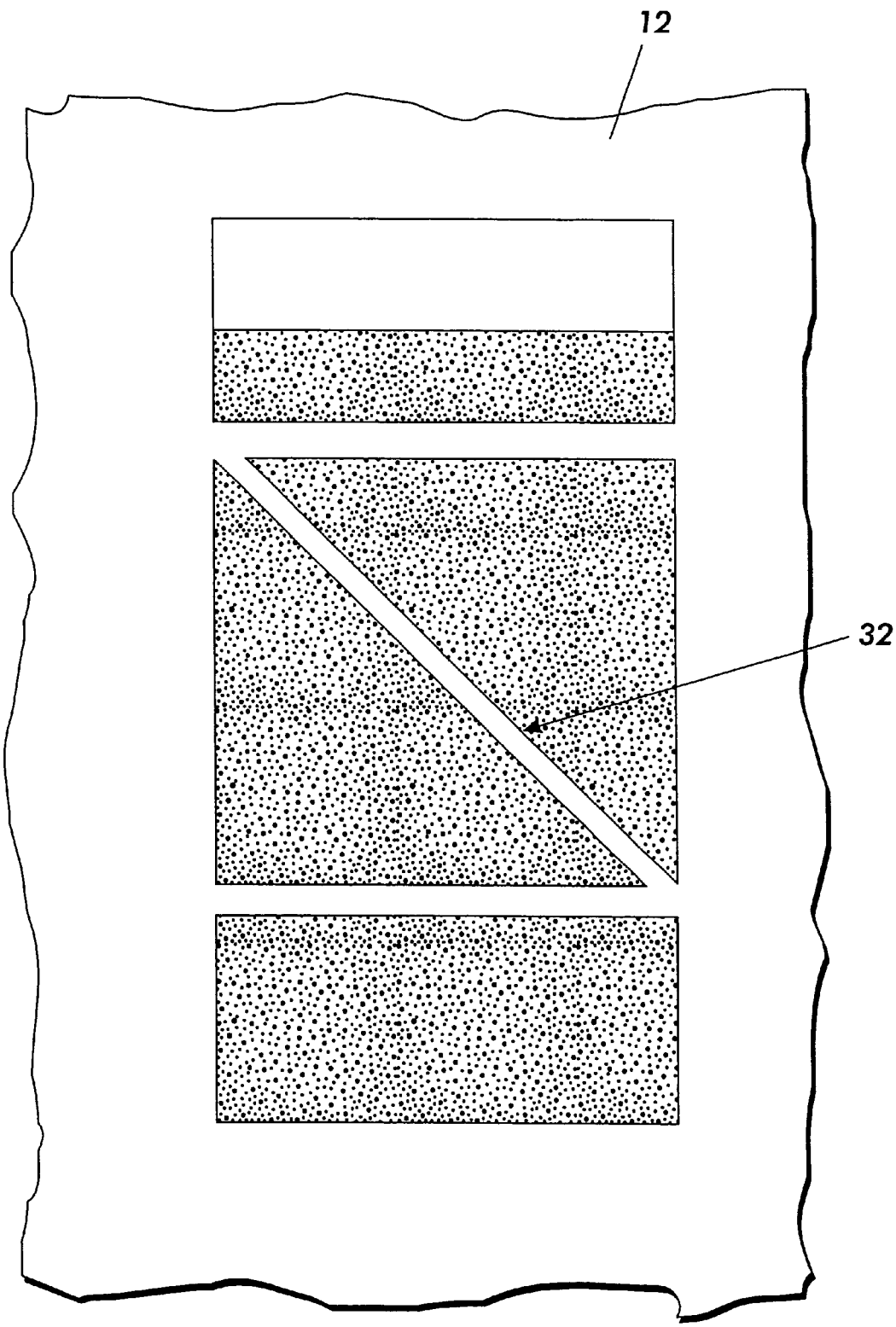
FIG. 4 is similar to FIG. 3, but illustrating a different version of one of the exemplary "Z" registration marks of FIG. 2, in which the "Z" is formed by "black separation", i.e., un-imaged and undeveloped ("white" or bare PR areas) in an otherwise solid black image patch.
Figure 5:
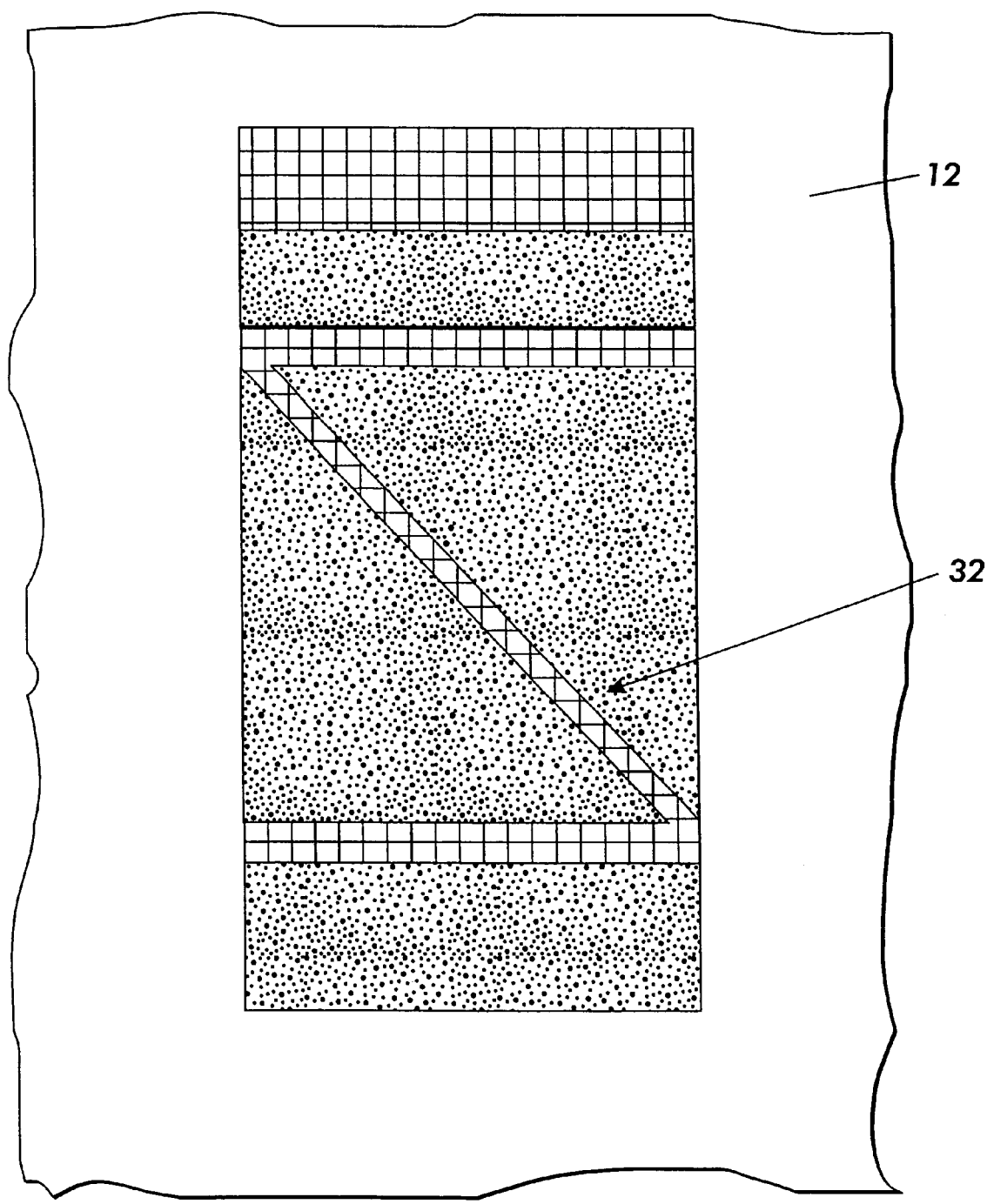
FIG. 5 is similar to FIGS. 3 and 4, but illustrating a different version of one of the exemplary "Z" registration marks of FIG. 2, in which the "Z" is formed by a combination of "separation" of one (surrounding) color (such as black), similarly to FIG. 4, plus imaging and development of another color (such as yellow) in the "Z" area itself, providing increased MOB sensor contrast.
Figure 6:
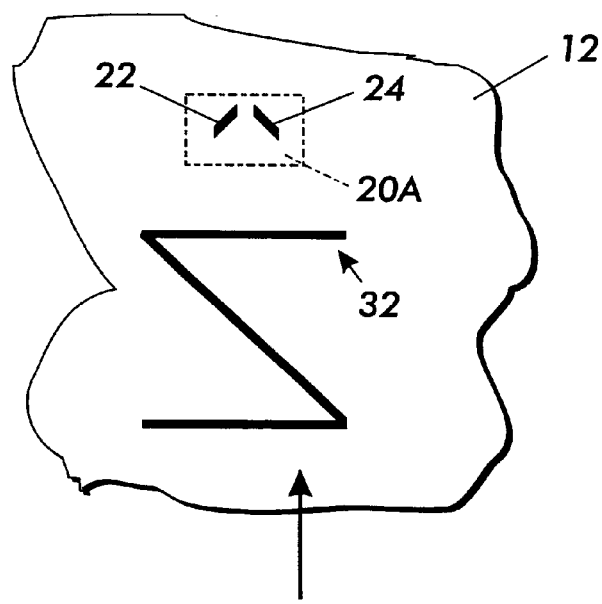
Figure 7:
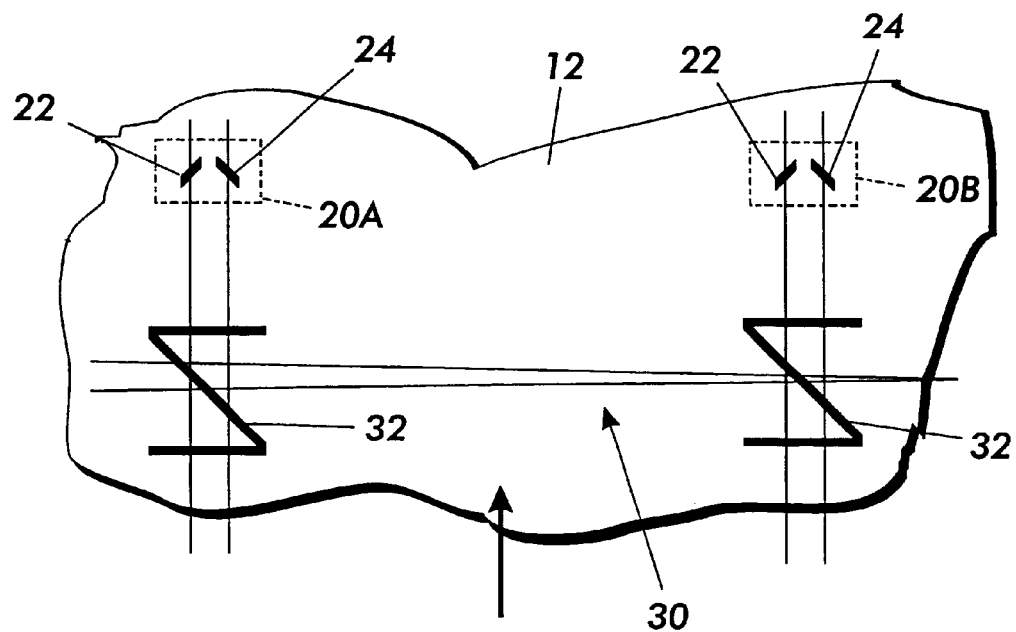
Figure 8:
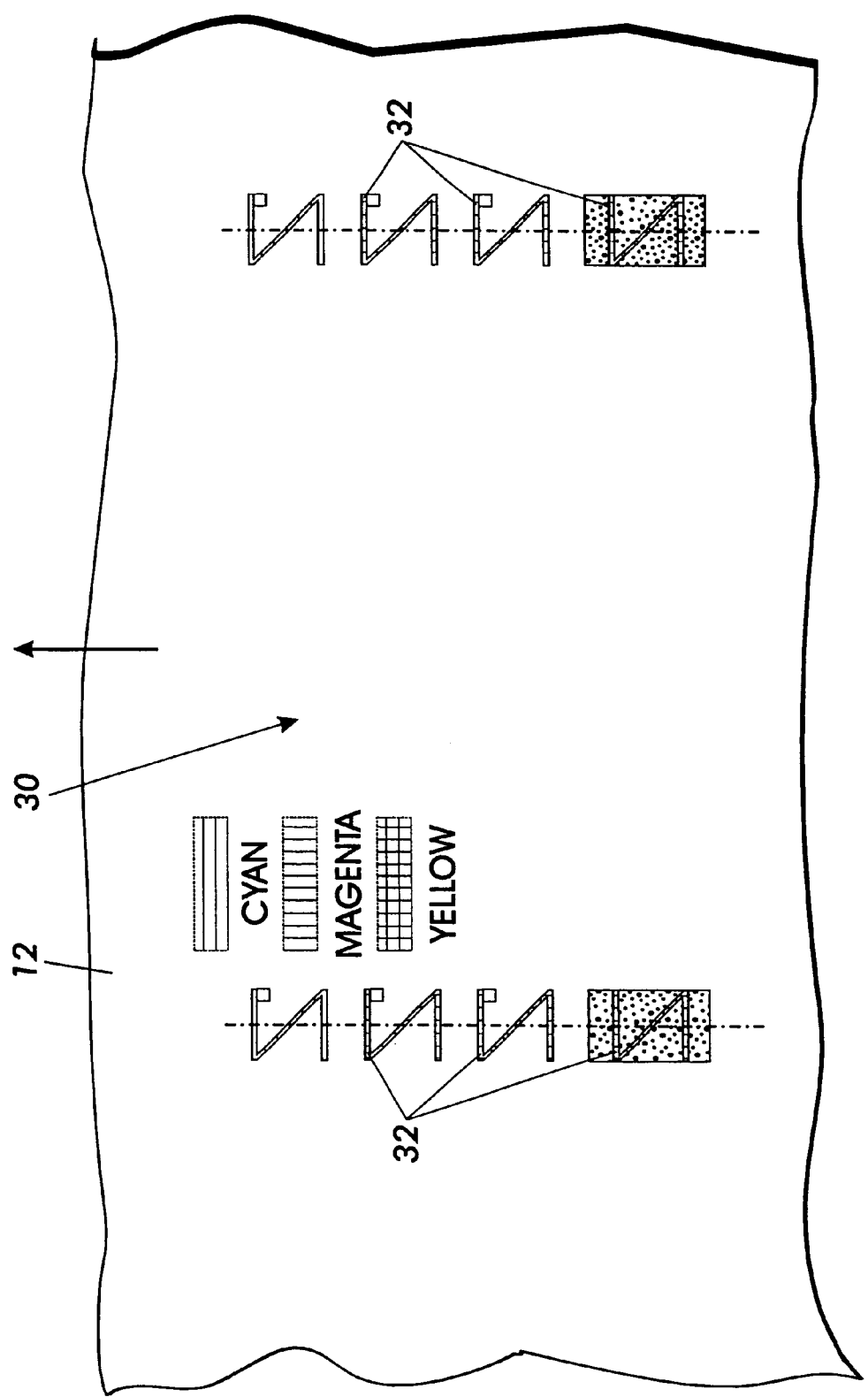
Figure 9:
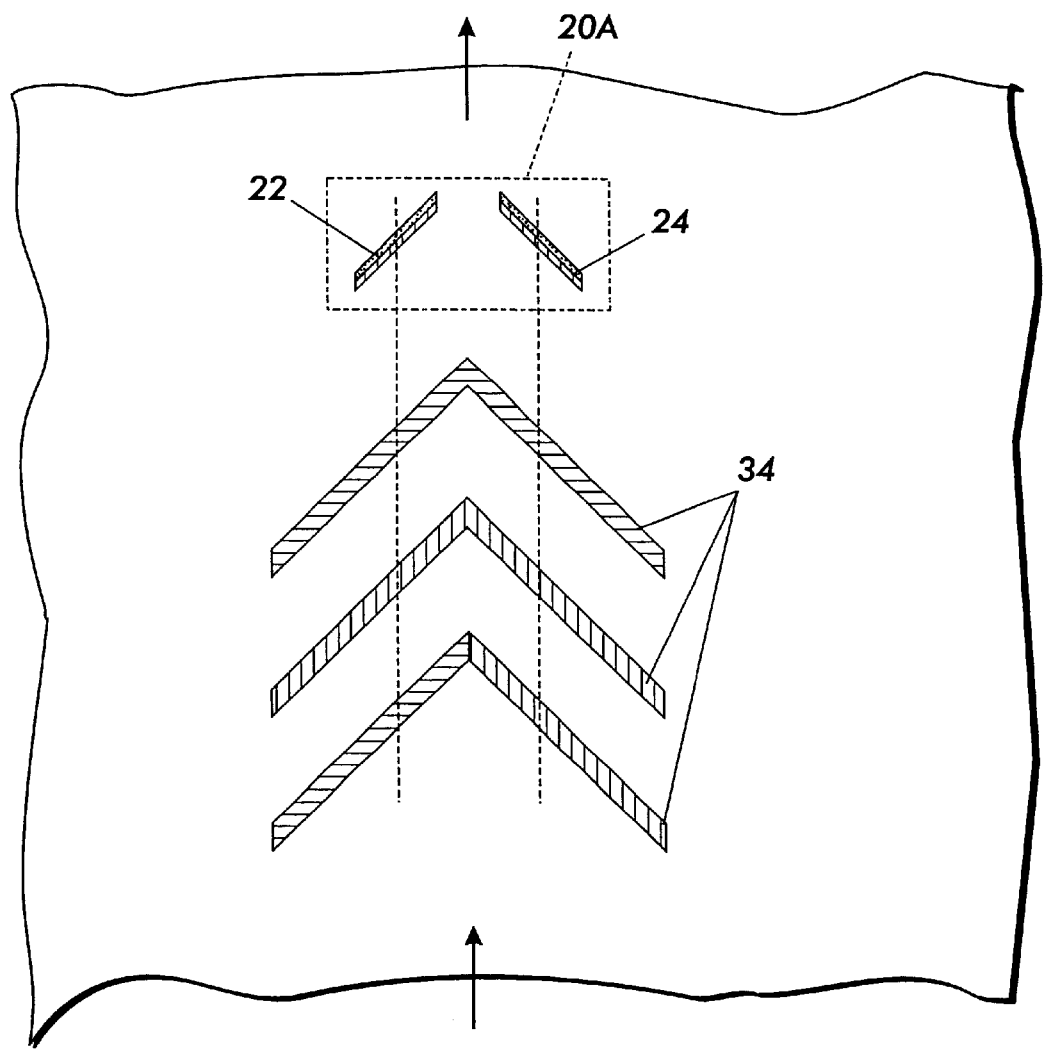
Figure 10:
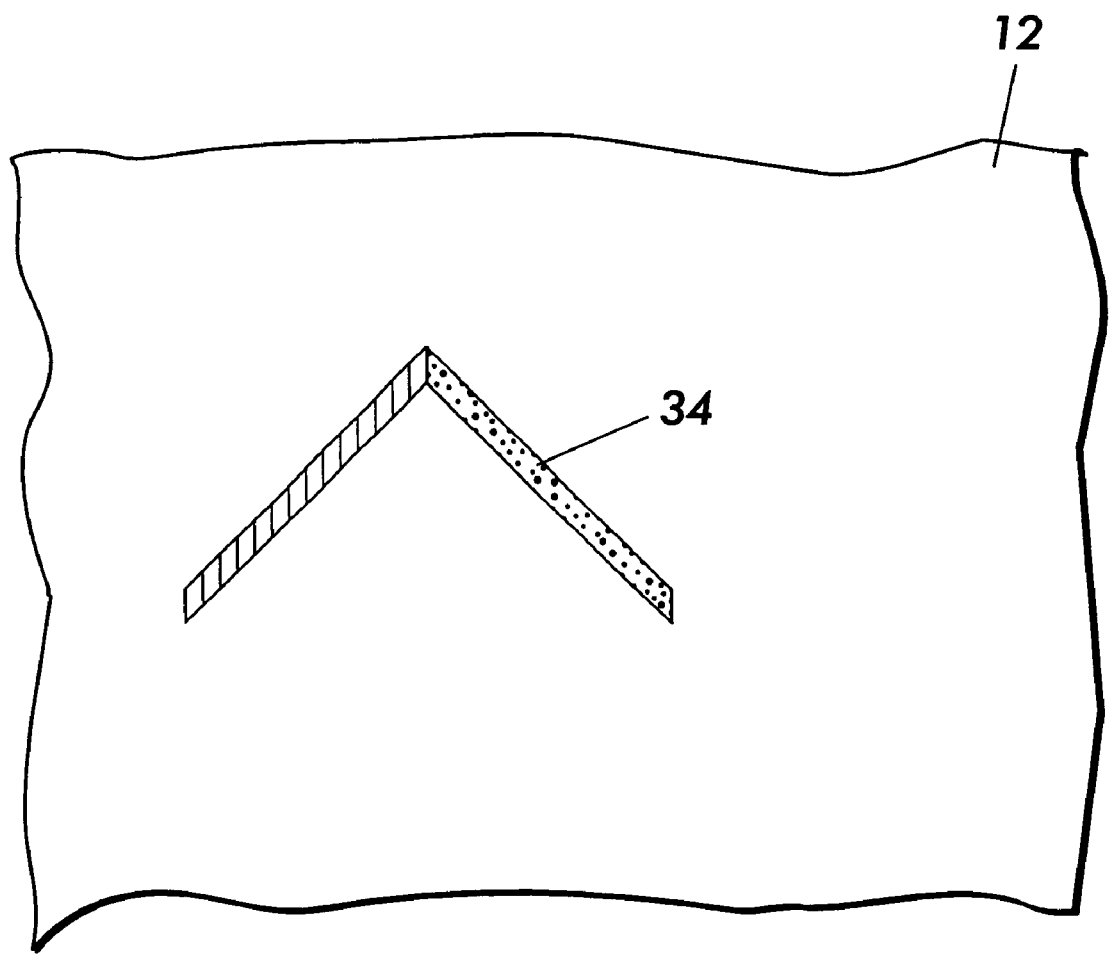
Figure 11:
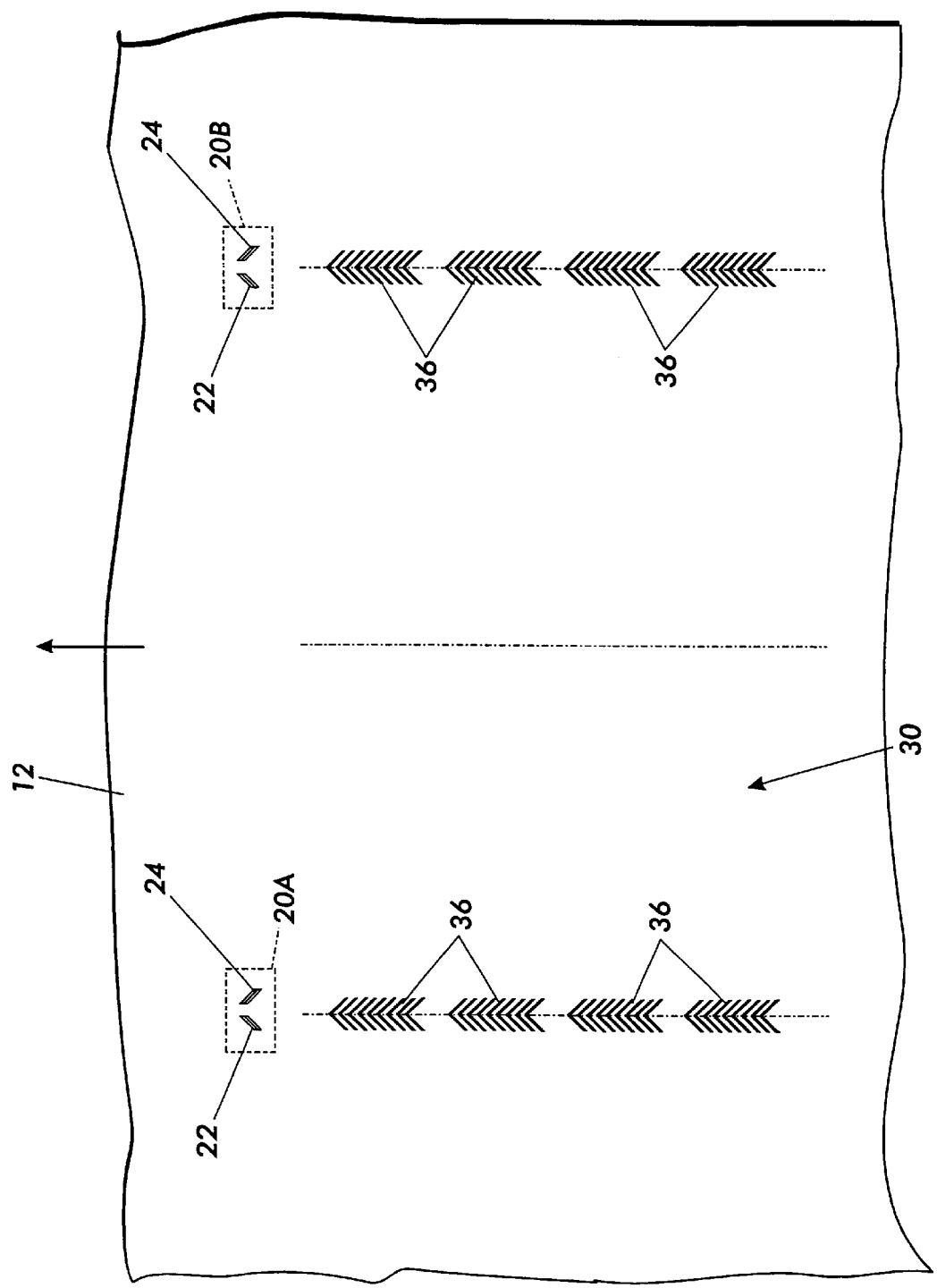
Figure 12:
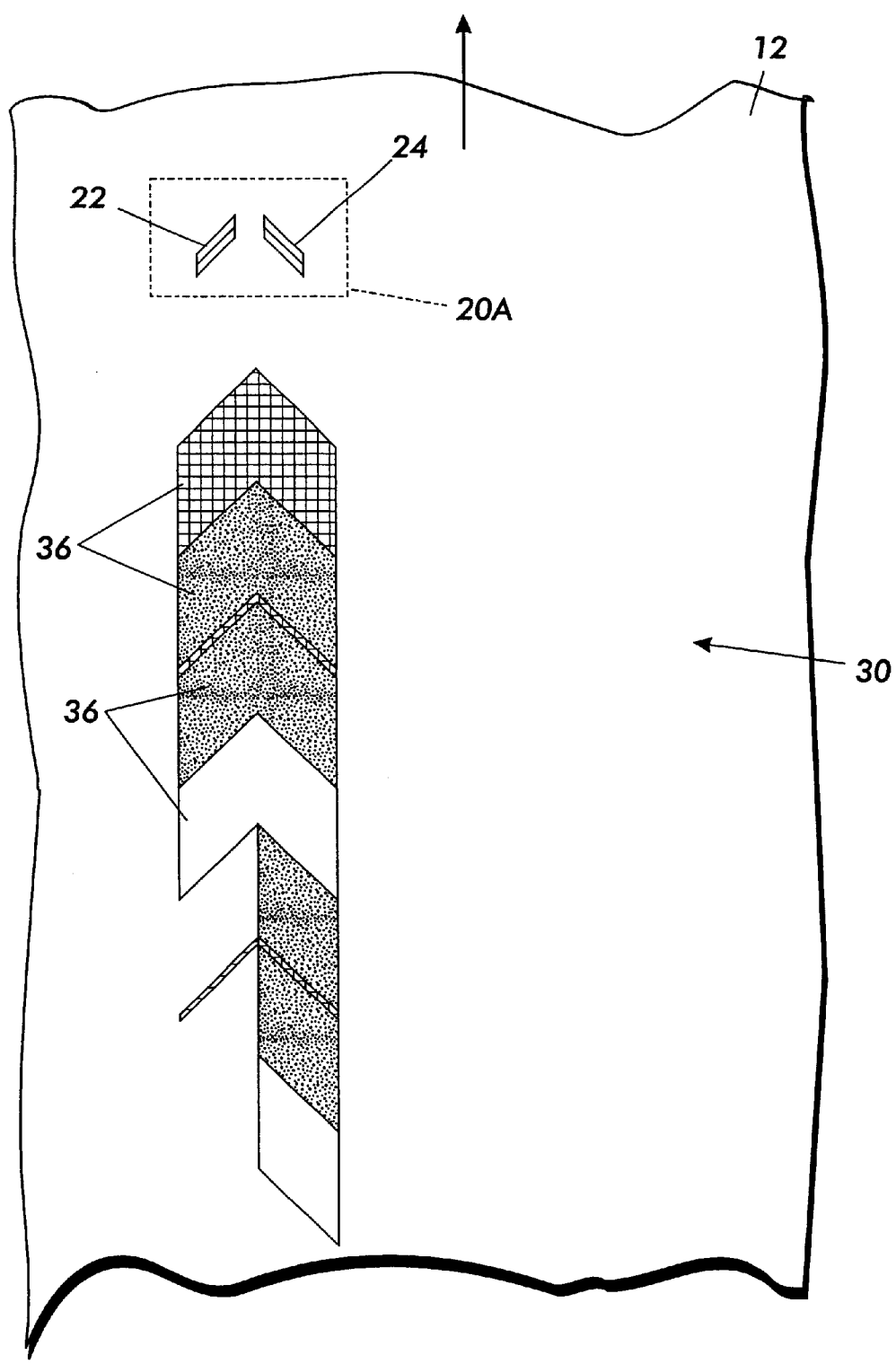
Figure 13:
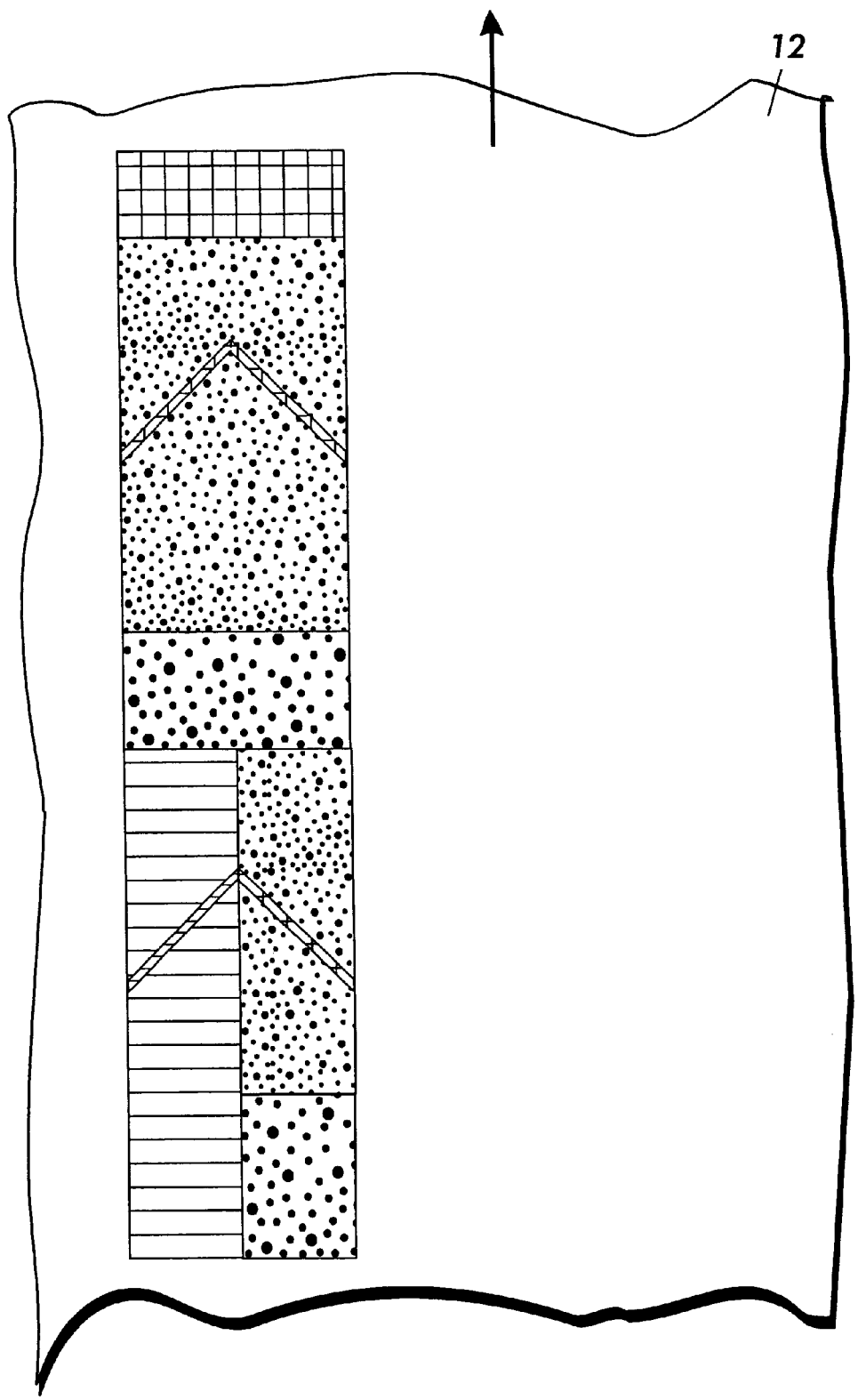
Figure 14:
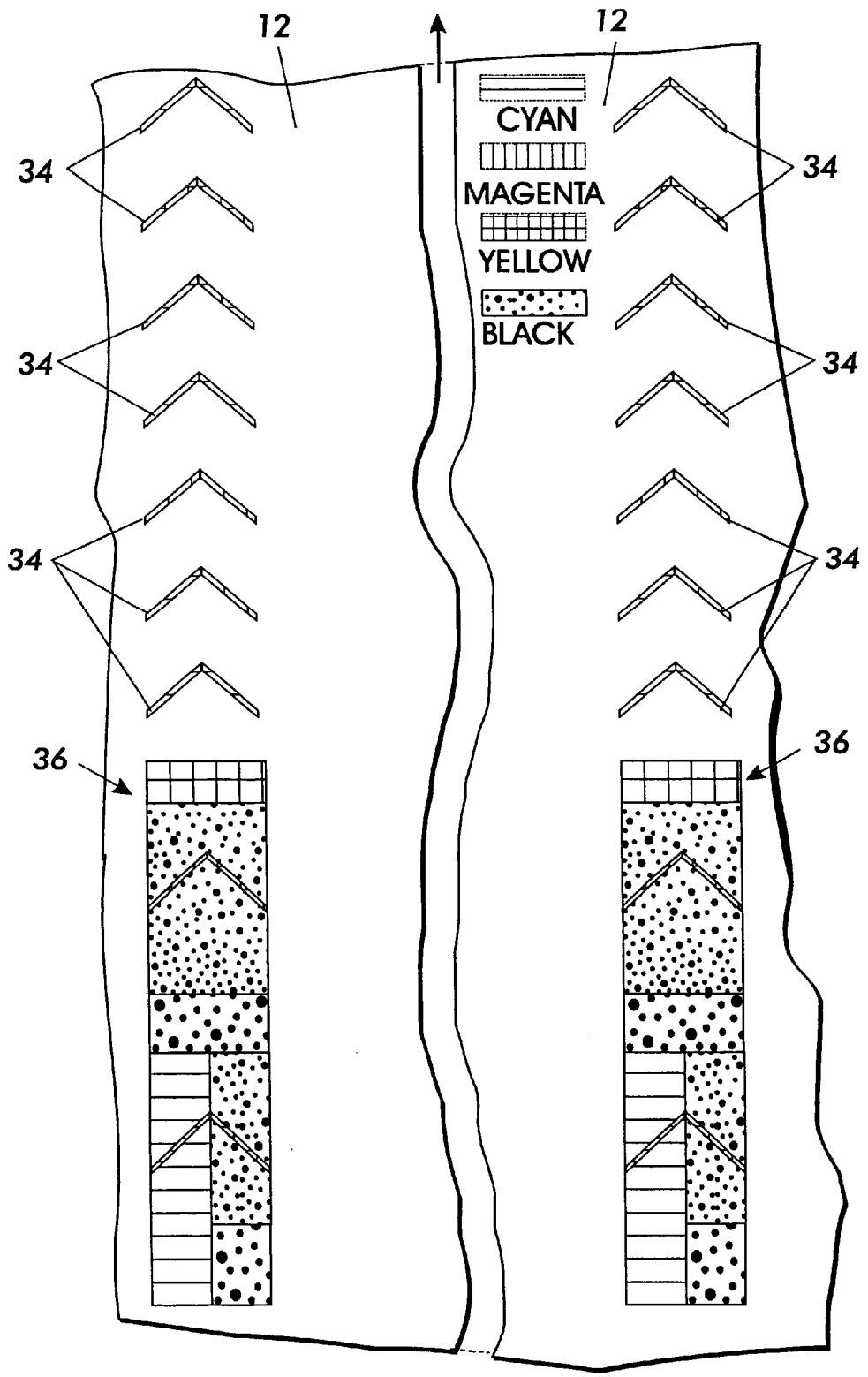

FIG. 6 shows a small area of the photoreceptor belt of FIGS. 1 and 2 with a "Z" MOB as in FIG. 4 moving towards (to pass under) an exemplary schematic MOB sensor with spaced apart dual angled legs (chevron configured) bi-cells, illustrating how a lateral misregistration of the Z pattern or target relative to the MOB sensor position may be detected by the respective offset signal from the MOB sensor detection in the one leg of the central portion of the Z pattern which is at the same angle;

FIG. 7 is similar to FIG. 6, but showing the similarly detected Z targets by MOB sensors on opposite sides of the PR belt also detecting image skew from the slight process direction positional differences of the opposite-side Z targets providing signal timing differences;

FIG. 8 is similar to FIG. 7 but illustrates a plurality of such Z targets (with scanline targets) for the different respective color images on opposite sides of an image area, including one of the FIG. 5 Z targets (in this image area is illustrated a test image, which, merely for illustrative purposes here, shows cross-hatching conventions used herein);

FIG. 9 is an enlarged schematic top view of the same PR belt area as in FIGS. 6–8 but in which the difference is that the color registration marks imaged and developed on the PR belt have been switched from "Z" targets to exemplary "chevron" targets about to pass under the same MOB sensor;

FIG. 10 shows an alternative to the chevrons of FIG. 9 in which the two legs of the chevron are different colors;

FIG. 11 is similar to FIG. 8 but illustrating plural patterns of plural chevrons of different colors on each side of a composite colors image area for maintaining fine registration by the MOB sensors, as compared to the pattern of Z marks used for initial gross registration in a first mode of operation;

FIG. 12 shows an example of the subject "expanded chevrons" mode of operation of the disclosed embodiment in a plan view of one side of the same PR belt, similar to FIG. 9 but with a plurality of expanded chevrons, as will be further explained herein;

FIG. 13 is another example of the subject "expanded chevrons" registration marks with an additional feature of perpendicular transitions between chevron areas; and FIG. 14 shows an example of the layout of all of the marks on the belt comprising this example of a expanded chevrons set.

Describing now in further detail the exemplary embodiment and variants thereof with reference to these Figs., there is schematically shown in FIG. 1 a printer 10 as one example of an otherwise known type of xerographic plural color "image-on-image" (IOI) type full color (cyan, magenta, yellow and black imagers) reproduction machine, merely by way of one example of the applicability of the exemplary color registration system. A partial, very simplified, schematic perspective view thereof is provided in FIG. 2. This particular type of printing is also referred as "single pass" multiple exposure color printing. It has plural sequential ROS beam sweep PR image formations and sequential superposed developments of those latent images with primary color toners, interspersed with PR belt re-charging. Further examples and details of such IOI systems are described in U.S. Pat. Nos. 4,660,059; 4,833,503; 4,611,901; etc.

However, it will be appreciated that the disclosed improved color registration system could also be employed in non-xerographic color printers, such as ink jet printers, and/or in "tandem" xerographic or other color printing systems, typically having plural print engines transferring respective colors sequentially to an intermediate image transfer belt and then to the final substrate. Thus, for a tandem color printer it will be appreciated the image bearing member on which the subject registration marks are formed may be either or both on the photoreceptors and the intermediate transfer belt, and have MOB sensors and image position correction systems appropriately associated therewith. Various such known types of color printers are further described in the above-cited patents and need not be further discussed herein.

Referring particularly to FIG. 12, there is illustrated one example of the subject "expanded chevrons" initial target pattern providing for a coarse color registration adjustment in the process direction or axis. This "expanded chevrons" target pattern allows the same MOB sensors to better detect the position of each color even if there is a large amount of process direction error between the different colors being imaged onto the photoreceptor belt. If there is such a large process direction error, the respective chevron marks may be imaged too close together, or even overlap, in the process direction, so as to not be individually detectable by the MOB sensor. In the expanded chevrons pattern, the marks are sufficiently spaced out in the process direction so that there will be no overlap of colors in the process direction even in the presence of large process direction errors. The amount of this increased distance between chevrons which is needed to accomplish that will, of course, depend on the initial registration error latitudes of the particular color printer.

For example, if the initial color registration setup uses a nominal time delay between the sensing of a belt hole or other permanent belt registration mark and the generation of a ROS image synchronization signal, the initial lead edge registration position of the first image and its associated chevron registration mark on the photoreceptor surface will vary with variations in the mechanical tolerances between the positions of the belt hole sensor and the respective ROS for that printer. This lead edge error may be learned, and accommodated, by measuring the relative lead edge registrations between the different colors using the chevron marks and the MOB sensor, and correcting for the lead edge delays. However, given the large initial lead edge variability, the expanded chevrons ensemble prevents the lead edges of the marks from the different colors from overlapping.

The expanded chevrons mode allows initial closed loop convergence to registration accuracy sufficient to switch to the standard narrow chevrons. The standard chevrons allow more sets of registration marks to be imaged per pitch (image area) and per belt revolution, for greater process direction registration control.

Shown in FIG. 13 is an example of a flood-filled black "expanded chevrons" registration marks with an additional feature of perpendicular imaged area transitions between chevron areas. This is to additional avoid MOB sensor errors in some cases. As shown, both the expanded and regular black chevrons may employ a black chevron mark surrounded or flood-filled with yellow, rather than leaving a bare photoreceptor surface area around the mark. Additionally, as shown, the transitions between the mark areas may be straight edges transverse the movement direction. That is, not angled relative to the process direction like chevrons. These abutting rectangles may avoid bare photoreceptor area transitions therebetween, and their transitions provide a much weaker transition signal from the angled bi-cells of the MOB sensors (below a threshold level) than an angled chevron mark. This reduces the chance for a MOB sensor to produce a false extra mark signal (extra time stamp) between actual marks. Thus, in this particular FIG. 13 example, there is, in the process direction, approximately, a 3 mm long yellow rectangle mark at the lead edge of the black "flood-filled" image. This initial yellow guarantees that the MOB sensor will not trigger on a belt to black transition at the lead edge of this mark. The sensor may or may not be able to sense the difference between the black toner and the PR belt, depending on the type of toner and the type of PR belt. The Lead edge yellow mark ensures a single transition so the MOB sensor knows to start looking for the marks.

The next registration mark that the MOB sensor is able to detect is the chevron mark that shows through the space in the black toner, indicating to the system the position of the black separation. The next marks that the sensor is able to detect is the cyan-yellow split chevron, indicating to the system the position of black with respect to cyan. Since a cyan chevron was detected prior to the flood-filled target in FIG. 13, the system can now use the same algorithms as with the regular chevron marks to determine the process and lateral position of black relative to cyan. The algorithms require a sequence of 3 chevrons in order to determine process and lateral color position with respect to a reference color: 1) Reference color chevron (cyan), 2) color chevron (Magenta, yellow, or flood-filled black), 3) Split chevron between Reference color and the color.

Note the similarity in several respects to the FIGS. 4 and 5 "Z" marks with leading, trailing, and surround color areas with perpendicular line transitions between those areas. As this exemplifies, it will be appreciated that various of the other descriptions and drawings herein as to the optional initial "Z" mark MOB sensing herein may also apply to this initial expanded chevrons sensing.

However, first referring further to the exemplary printer 10 of FIGS. 1 and 2, all of its operations and functions may be controlled by programmed microprocessors, as described above, at centralized, distributed, and/or remote system-server locations, any of which are schematically illustrated here by the controller 100. A single photoreceptor belt 12 may be successively charged, ROS (raster output scanner) imaged, and developed with black and/or any or all primary colors toners by a plurality of imaging stations. In this example, these plural imaging stations include respective ROS's 14A, 14B, 14C, 14D, and 14C; and associated developer units 50A, 50B, 50C, 50D, and 50C. A composite plural color imaged area 30, as shown in FIG. 2, may thus be formed in each desired image area in a single revolution of the belt 12 with this exemplary printer 10, providing accurate registration can be obtained. Two MOB sensors (20A in FIG. 1, 20A and 20B in FIG. 2) are schematically illustrated, and will be further described herein in connection with such registration. Each MOB sensor in this example has two bi-cell optical detectors 22 and 24, at opposite 45 degree angles to the process direction, and will be further described later.

The belt 12 has a conventional drive system 16 for moving it in the process direction shown by its movement arrows. A conventional transfer station 18 is illustrated for the transfer of the composite color images to the final substrate, usually a paper sheet, which then is fed to a fuser 19 and outputted.

The belt 12 may be an otherwise known or conventional organic photoreceptor belt, on which there is extensive patent and other literature, or other materials. [For example, Xerox Corp. U.S. Pat. Nos. 4,780,385 issued to Fran Weiloch et al.] It need not be described in detail herein since that is not relevant to this invention.

Referring to FIG. 2, it may be seen that fiducial or registration holes 12A, 12B, 12C, 12D, etc., (or other permanent belt marks, of various desired configurations) may also be provided along one or both edges of the photoreceptor belt 12. These holes or marks may be optically detected, such as by belt hole sensors, schematically shown in this example in FIG. 2 as 22A, 22B, 22C, 22D. Various possible functions thereof are described, for example, in the above-cited patents. If desired, the holes or other permanent belt markings may be located, as shown, adjacent respective image areas, but it is not necessary that there be such a mark for each image position, or that there be plural sensors. Also, the number, size and spacing of the image areas along the photoreceptor belt may vary. For example, changing for larger or smaller images in the process direction for printing on larger or smaller sheets of paper.

However, as noted, the present registration system more particularly relates to producing temporary imaged and toner-developed registration marks on the photoreceptor relating to the position of images being generated thereon, for registration of the different color images relative to one another and/or to the moving photoreceptor surface, which toner marks are detected by MOB sensors such as 20A and/or 20B, to provide positional information therefrom. In FIG. 2 it may be seen that "Z" shaped such toner registration mark images 32 have been formed along both sides of the printer 10 photoreceptor belt 12, adjacent but outside of its imaged area 30, as will be further described. However, as will be discussed, in different operating modes of the same printer 10 example those "Z" marks 32 shown in FIG. 2 are automatically replaced with chevron shaped toner registration mark images such as 34, or expanded chevrons such as 36. (These or other registration marks are alternatively referred to as a target, MOB, or pattern herein.) The exemplary improved color images registration system of the Figs. may have at least two, or three, such different operational modes, all of which can use the same MOB sensors. However, this registration system is not limited to that number of operational modes or steps, or to particular MOB sensors or controls.

In this registration system embodiment, there is an initial image registration or setup mode, which can provide initial registration even from a gross initial misregistration. Initial gross color images misregistration can exist, for example, when the machine is first run after manufacturing, or after a service call, after a ROS repair, after a PR belt change, etc. In such cases the initial lateral position of each color image area, and thus its directly associated MOB position on the PR belt 12, could be out of registration by +/−3 mm, for example. If the MOB sensor 20A or 20B has a lateral sensing range for a standard chevron belt mark target 34 of less than 1 mm, it will not provide registration of such an out-of-registration MOB 34. In order to insure that the MOB sensors "see" each color registration mark in this initial state (the image registration setup mode), there is provided here an optional initial generation, during this initial state only, of "Z" shaped color registration marks such as 32, providing the MOB sensors with a greater lateral sensing range, instead of chevron shaped marks such as 34 or 36. Exemplary such "z" pattern MOBs are shown in the expanded views of FIGS. 3–8. Appropriate initial use of such "Z" marks instead of chevron marks on the belt for initial registration can increase the lateral sensing range of the MOB sensors in that mode of operation by an order of magnitude, e.g., from approximately +/−1 mm for chevron marks to approximately +/−10 mm for "Z" marks. This can avoid manual initial adjustments to get the registration within the sensing and control range of the MOB sensors. To express that another way, avoiding "open loop" adjustment situations where the otherwise desired chevron registration marks are out of range and not detectable.

By using registration targets imaged along the length of the belt for each color being imaged, the lateral position, lateral magnification, and skew of each color can be measured relative to the fixed position of the MOB sensors. These new values may then be continuously updated within the controller 100, such as in a ROS interface module.

This initial calibration procedure of writing, developing, and measuring respective marks or targets around the belt length (the belt circumference, the process direction) is repeated for each color. The MOB sensor error signals may be converted to position and magnification correction signal for the respective ROS in a known manner. It may be in terms of first pixel delay times and pixel clock frequencies for the ROS systems. One color, such as cyan, may be used as a calibration or base position. The PR belt rotation, and this iterative routine calibration process, may be repeated until convergence within acceptable thresholds is achieved to a preset threshold.

The MOB sensor may generate a "timestamp" signal from the MOB sensor's detection (crossover) of the lead edge or leg of the registration pattern in the case of a Z mark (the top or bottom line of the Z) to the crossover of the intermediate diagonal line or leg of the Z. It may also time stamp the trail edge (bottom or top line) of the Z. By comparing those timestamps, one can calculate the Z pattern positions on each side of the PR belt relative to the centroid or center line in the process direction of the MOB sensor 20A or 20B bi-cell detector areas 22, 24 (see FIGS. 6 and 7 and their above descriptions in particular).

As shown in FIG. 7, the differences in these same sensed time signals between the two laterally spaced apart MOB sensors 20A and 20B, reading correspondingly laterally spaced Z or other targets generated by the same ROS for the same color, provides image skew signals which can be used to generate de-skewing control signals.

The "Z" pattern, target, or cursor size may be made sufficiently large enough to insure that it is always within the sensing range of the MOB sensor even for the maximum amount of anticipated gross initial lateral misregistration. The latter will of course vary with machine tolerances of a particular product. For example, the Z mark may be approximately 19 by 19 mm square, so that the leading and trailing lateral legs or bars of the Z are about 19 mm wide with a 45 degree angled middle leg as shown. Thus, this middle line or leg of the Z is at the same angle as one of the two bi-cells 22 or 24 in the MOB sensor, which is also the same angle as one of the two legs of a chevron pattern, target or cursor, such as 34 or 36, so as to provide a similar sharp, high signal strength, detection by the full area of the bi-cell.

Once the registration positions of all the colors (or "image separations") are within the preset threshold or sensing range of the MOB sensors for chevron marks, the subject system automatically switches to a second mode of operation, in which there is writing, developing, and MOB sensor measuring of chevron shaped registration targets corresponding to the respective colors along the belt. This mode switching can be done when the MOB sensors are detecting approximately the center of the Z. I.e., when the ROS is printing the Z in a lateral position on the belt in which the middle of the angled line of the Z is triggering the MOB sensor. Or to express it yet another way, when the intermediate crossing time of the angled line in the Z pattern is substantially equidistant from the crossing times of the top and bottom lines of the Z pattern.

The next (or first, if a Z pattern mode is not utilized) operational mode or phase here is the "expanded chevron" initial reference image adjust phase, with expanded spaced chevrons as shown in FIG. 14, and as described above, and here. Due to initial misregistration tolerances, lead edge (process direction) misregistration may initially be too large for the standard spaced chevron ensemble or set, so that such an expanded chevron mode of operation may be initially very desirable. For example, the expanded chevron mode can be used to refine and adjust the position of the cyan or other registration baseline image offsets.

This "expanded chevron" step or mode provides a target pattern that will allow a coarse color registration adjustment. That is, a different target which will allow the marks-on-belt sensor to detect the position of each color even if there is a large amount of process direction error between the colors. The MOB sensors may not readily detect color positions with the standard size chevrons ensemble if there is a large amount of process registration error between the colors, because the marks may be nominally too close together. In the expanded chevron ensemble, however, the marks are spaced out sufficiently in the process direction so that there is no overlap of colors in the presence of large process direction errors. For example, by providing an expanded chevron spacing in the process direction of about 8.5 mm (200 scanlines at 0.04233 mm/scanline) as opposed to a normal chevron dimension in the process direction of about 2 mm. However, the 45 degree angles of the legs of these expanded chevrons may remain the same. The transverse dimension (widths) of these chevrons may also be the same, e.g., about 10.4 mm. However, as shown and described, the respective expanded chevron legs have a much greater spacing between them in the process direction. Also, as shown in FIGS. 13 and 14 and described above, other features may be provided. What is actually detected when measuring the positions of expanded chevrons are marks that have the same thickness as when measuring standard chevrons.

As to the example here of a flood-filled black portion, this is a slightly different form of expanded chevron. Registration of black images (images being developed with black toner) present a special case, because this MOB sensor has difficulty detecting the difference between a black registration mark and an adjacent bare surface of an unmarked (undeveloped) area of the photoreceptor. The mark is more readily detectable by the MOB sensor by using a negative image, such as a large area of black imaged on top of yellow except in the registration mark area, where black is not imaged, i.e., the black mark is the absence of black to expose the yellow to the MOB sensor in the mark chevron pattern in the midst of an otherwise flood-filled black area. This prevents extra false MOB sensor signals, to insure the correct number of MOB sensor signals corresponding to the number of chevrons in each set of expanded chevrons.

This negative black expanded chevron mark is preferably the last mark in the set or combination of individual marks forming the expanded chevrons. Referring particularly to FIG. 14, preferably the first chevron mark in the set is the single reference color, then the second chevron mark is for next color desired to be measured or registered relative thereto, then (thirdly) there is a two color chevron with one half (one leg) being the same reference color and the other half or leg being the other color one is measuring the location of. (Thus, it will be appreciated that the two legs of that third, split color, chevron will be offset from one another in the process direction until complete registration is achieved.) Then these three steps may be repeated three times and then followed by the above negative black expanded chevron mark.

By way of background, at the initial system color registration setup, a nominal delay may be used from a PR belt hole being sensed to the generation of an image synch signal. The lead edge registration can therefore vary by the mechanical tolerance of the belt hole sensor to the ROS, etc. This lead edge error may be learned by measuring the relative lead edge registration between colors using the MOB sensor, and correcting the appropriate lead edge delay. Given a relatively large initial lead edge variability, an expanded chevron ensemble is desirable to prevent the chevrons of different colors from overlapping. If the marks touch each other or overlap, the MOB sensor will not be able to detect the locations of each single mark.

To express this in other words, during initial system setup, a nominal delay is used from the belt hole being sensed, to the generation of the image synch signal. The color to color registration will have a significant amount of error due to system tolerances (belt hole sensor to the ROS imagers, PR module encoder roll diameter, encoder tolerances, ROS to ROS positioning errors). The color to color offset may be too large for use of a standard chevron, causing the colors to overlap so that the MOB sensors cannot interpret the mark. At this point the reference color may still have a significant amount of error with respect to the MOB sensors. For these reasons, an expanded chevron ensemble may be used. This will allow enough initial closed loop convergence, even with very large process direction misregistration, so that the standard chevron ensembles may than be used thereafter (automatically switched on) to further refine the image registration.

Either or both of the initial "Z" marks gross registration mode or step, and any this initial expanded chevron initial registration mode or step, may last for several PR belt 12 revolutions and MOB signal generations until initial gross registration is achieved, before the reproduction system automatically begins its standard operation, with the generation and sensing of standard chevrons, for standard MOB registration. As noted, chevron registration marks desirably provide higher registration accuracy for fine MOB sensor registration measurements than the initial "Z" marks.

Turning to details of the exemplary MOB sensor 20A or 20B of the Figs., it optically senses the difference in reflectance between the respective toner developed marks on the belt and the belt surface, as described in various of the above-cited references. It will be appreciated that the invention herein is not limited to the precise or specific exemplary MOB sensor shown and described herein, or in the above-cited references. In the exemplary MOB sensor shown herein, as each (sufficiently previously grossly laterally registered) toner developed chevron shaped mark-on belt pattern 34 for each color image on the belt moves under the MOB sensor, LED's in the MOB sensor illuminate the chevron MOB 34, and the two angled legs of that chevron are detected by two equally angled photodetecting bi-cells 22, 24 on each side of the MOB sensor. These bi-cells may, for example, be two cells with a 4 mm by 0.5 mm rectangular sensing coverage each mounted side by side in the MOB sensor to provide 4 mm by 1 mm sensing coverage. Likewise, in the bi-cell on the other side of the MOB sensor, to provide four sensing cells per MOB sensor. The two legs of the chevron MOB, and the two corresponding legs of these two bi-cell detection zones 22, 24 of the MOB sensor, are desirably both angled at the same 90 degrees to one another, and are all 45 degrees to the process direction. The electrical outputs of this particular MOB sensor are pulses which occurs when each leg of the chevron arrives under the center of its respective bi-cell detection leg. That is, each detected chevron provides an output when it is evenly "seen" by both cells of that bi-cell, by subtracting the signal from one cell from the signal from the other cell of that bi-cell. A zero point signal is thus provided when that leg of that chevron is centered under that bi-cell. The actuation of a bi-cell by a chevron leg passing under it also provides a timing signal, which may be called a "time stamp." An exemplary MOB sensor may employ two IR LEDs and a crystalline silicon photodiode array composed of two off-the-shelf commercially available bi-cells, in a common plastic packaging, mounted at 90 degrees (+ or − about 2 degrees) to one another. The IR illumination, which is diffusely reflected from the MOB image, may be collected by an integral lens to conventionally produce a current in the photodiodes in an unbiased photovoltaic mode that is proportional to the photodiode area and the (relatively constant) illumination intensity. A conventional current-to-voltage amplifier may convert the signal to a voltage level. Hi-pass signal filtering may be used. The direction (orientation) of the two LED IR illuminations may be from the ends of the MOB chevron legs along the chevron legs, to avoid shadows between toner piles and minimize intensity gradients normal to the gap between the bi-cells.

Further matching of the shape of the two MOB sensor bi-cells (split photocells) to the chevrons to improve signal-to-noise properties may be desirable. That may include widening the lateral distance between the inner ends of the two bi-cells and/or shaping the area of each bi-cell as a parallelogram (rather than a rectangle), with front and back edges remaining at 45 degrees to the direction of PR travel (the process direction) but with medial and lateral edges (ends) parallel to the direction of PR travel.

Differences in the arrival times of the two opposing legs of a chevron at the two respective opposing legs (bi-cells) of a MOB sensor determines the lateral position of that chevron MOB relative to the MOB sensor. That is, the time stamp signal of one bi-cell may be compared to the time stamp signal of the other bi-cell of that MOB sensor. Thus, the difference between different color chevron lateral positions detects the position of one color toner image relative to another. To express it in other words, as shown in FIG. 9 for example, a chevron which is not centered relative to the MOB sensor, i.e., is laterally misregistered, will have one leg of that chevron detected by one bi-cell before the other, by an amount of time stamp difference proportional to the misregistration.

As noted, two separately positioned but otherwise identical MOB sensors 20A and 20B may desirably be utilized. They may both be located between the last (final color) developer station and the image transfer station, as shown in FIG. 1. Preferably the two MOB sensors are spaced apart on opposite sides of the PR belt 12, as shown in FIG. 2, to sense Z or chevron marks which are generated on opposite sides of the belt from the same color image area. That can desirably maximize image skew detection by maximizing time stamp differences between a chevron detected on one side of the belt relative to a chevron detected on the opposite side of the belt for a skewed image.

An additional optional function or utilization of MOB sensors may be to detect the position of a seam in the PR belt, or belt registration or belt seam location apertures (belt timing holes), if desired. However, other optical sensors may be conventionally used for that, such as 22A–22D shown in FIG. 2.

With various of the above-noted or other MOB sensor measurement output signals, it will be appreciated that various high pass filtering, averaging, and/or weighting techniques may be utilized. Also, initial calibrations, including the setting of the respective MOB sensor illumination levels, may be provided for the MOB sensors and their current or voltage levels or ranges.

It will be appreciated that in this particular example of a color reproduction machine 10 which is an image-on-image xerographic printer, that the latent and developed (toner) image for each color is directly on top of the image and toner for the previously imaged and developed colors as the PR belt moves around its path in the process direction. Thus, both the Z image generation and chevron image generation for registration marks ROS controller software may be programmed to vary those registration marks positions in the process direction for each color, as shown, so that the registration mark for one color does not overlap the registration mark for another color, even though the images themselves may completely overlap. This need not be a large spacing distance, so that the different color chevron marks may even look like "sergeants stripes" (>>>>) for example. That is, the chevrons may be relatively closely spaced, as shown, but spaced apart by un-imaged non-toner spaces sufficient for the MOB sensor to be able to count or otherwise distinguish which particular chevron for that composite image is being sensed for registration accuracy at that time.

As noted, the registration marks are desirably outside of the maximum image area. Where the printer has its images and its paper path registered to one side, as is typical, (rather than center registered) the registration marks may be towards and along the other or outside edge of the PR belt. However, as shown herein, preferably even for such an edge registered system, for maximum skew registration sensitivity and accuracy, the registration marks, and the MOB sensors for reading them, are positioned spaced apart on opposite sides of the belt, on opposite sides of the image area.

It will be appreciated that although the illustrated first registration marks comprise a generally "Z" shaped pattern, and the second registration marks comprise a generally chevron shaped pattern, that variations therein providing the same effect may be provided. For example, the legs or lines forming the Z's and/or the chevrons may not necessarily be connected, i.e., may be formed by slightly separate lines. Likewise the two legs of the MOB sensor's chevron shaped bi-cell sensing areas need not be connected. It will also be appreciated that a reverse image of a "Z" (which may look more like an "S") is equivalent to, and intended to be covered by, any claims which refer to a Z shaped pattern or mark.

To reiterate, in this preferred embodiment, expanded chevron marks are spaced apart in the process (slow-scan) direction to allow for detection by the MOB sensor even in the presence of large process direction errors. The process direction spacing between the marks should be greater than the largest possible initial process direction color to color errors. The shape of the "flood filled" portion has been modified to reduce the chance of the MOB sensor detecting erroneous time stamps. All edges that are not intended to be detected have been straightened so that they are not directly parallel to the MOB sensor bi-cells.

While the embodiment disclosed herein is preferred, these are merely illustrative examples, and it will be appreciated from this teaching that various alternatives, modifications, variations or improvements therein may be made by those skilled in the art, which are intended to be encompassed by the following claims.

What is claimed is:

1. In a method of plural color printing with a color registration system for the registration of plural color images on an image bearing surface moving in a process direction, using plural registration marks imaged on said image bearing surface, which said registration marks correspond to the positions of respective said color images on said image bearing surface, and which registration marks are sensed by a registration marks sensor for detecting the positions of said registration marks on said image bearing surface, said registration marks sensor having a limited misregistration latitude, the improvement wherein;

said color registration system provides an initial gross registration mode in which said color registration system automatically images a plurality of first said registration marks on said image bearing surface, said first registration marks being formed to provide a wider misregistration latitude for said registration marks sensor in said process direction, imaging said first registration marks on said image bearing surface until an initial gross registration is achieved, then automatically switching said color registration system to a second registration mode in which said color registration system automatically images a plurality of second and different said registration marks on said image bearing surface having reduced misregistration latitude in said process direction for said registration marks sensor but providing higher registration accuracy with said registration marks sensor, said second registration mode forming said second and different said registration marks more closely spaced together in said process direction on said image bearing surface than said first registration marks.

2. The method of plural color printing with a color registration system of claim 1, wherein said second registration marks comprise a generally chevron shaped pattern, and wherein said first registration marks are expanded in the process direction relative to said second registration marks.

3. The method of plural color printing with a color registration system of claim 2, wherein said registration marks sensor has a generally chevron shaped sensing pattern corresponding to said generally chevron shaped pattern of said second registration marks.

4. The method of plural color printing with a color registration system of claim 1, wherein said plural color images on said image bearing surface are color separations being accurately superposed to form full color images.

5. The method of plural color printing with a color registration system of claim 1, wherein both said first and second registration marks are imaged and developed with imaging material along opposite sides of said image bearing surface.

6. The method of plural color printing with a color registration system of claim 1, wherein said image bearing surface is a photoreceptor of a xerographic printing system.

7. In a plural color reproduction apparatus with a color registration system for the registration of plural color images on an image bearing surface movable in a process direction, which color registration system generates plural registration marks imaged on said image bearing surface corresponding to the positions of respective said color images, and further including at least one registration marks sensor for detecting the positions of said registration marks on said image bearing surface, the improvement wherein:

said color registration system initially generates and images first gross registration marks on said image bearing surface providing wide misregistration latitude for said registration marks sensor in said process direction until an initial gross registration is achieved, said color registration system automatically switches to generate and image more closely spaced apart fine registration marks on said image bearing surface after said initial gross registration is achieved, said fine registration marks having reduced misregistration latitude in said process direction for said registration marks sensor but providing higher color registration accuracy.

8. The plural color reproduction apparatus with a color registration system of claim 7, wherein said fine registration marks comprise sets of closely spaced generally chevron shaped registration marks.

9. The plural color reproduction apparatus with a color registration system of claim 7, wherein both said gross and fine registration marks are imaged and developed with imaging material along opposite sides of said image bearing surface.

10. The plural color reproduction apparatus with a color registration system of claim 7, wherein said image bearing surface is a photoreceptor of a xerographic printing system.

11. The plural color reproduction apparatus with a color registration system of claim 7, wherein said registration marks sensor comprises a spaced pair of elongated bi-cell detectors in a generally chevron shaped pattern.

12. The plural color reproduction apparatus with a color registration system of claim 7, wherein said image bearing surface is a photoreceptor belt of a xerographic printing system, wherein said gross registration marks are repeatedly imaged along said photoreceptor belt in one operational mode for said initial gross registration, and wherein said fine registration marks are imaged along said photoreceptor belt adjacent to said plural color images in a second and operational mode for said fine registration.

13. The plural color reproduction apparatus with a color registration system of claim 7, wherein said image bearing surface is a photoreceptor belt, wherein said gross registration marks comprise chevron marks repeatedly imaged along said photoreceptor belt in sets thereof in one operational mode for said initial gross registration, and wherein at least one said set includes at least one chevron mark having two legs of two different colors, one leg being a reference color and the other leg being another color being registered.

14. The plural color reproduction apparatus with a color registration system of claim 7, wherein said image bearing surface is a photoreceptor belt, wherein said gross registration marks comprise chevron marks repeatedly imaged along said photoreceptor belt in sets thereof in one operational mode for said initial gross registration, and wherein at least one said set includes at least one chevron mark which is a negative black chevron mark formed by the absence of black in an area of another different and more detectable color.

* * * * *